Nov. 28, 1967    J. A. LEWIS    3,354,996
APPARATUS AND METHOD FOR CLUTCH REPAIR
Filed July 21, 1965
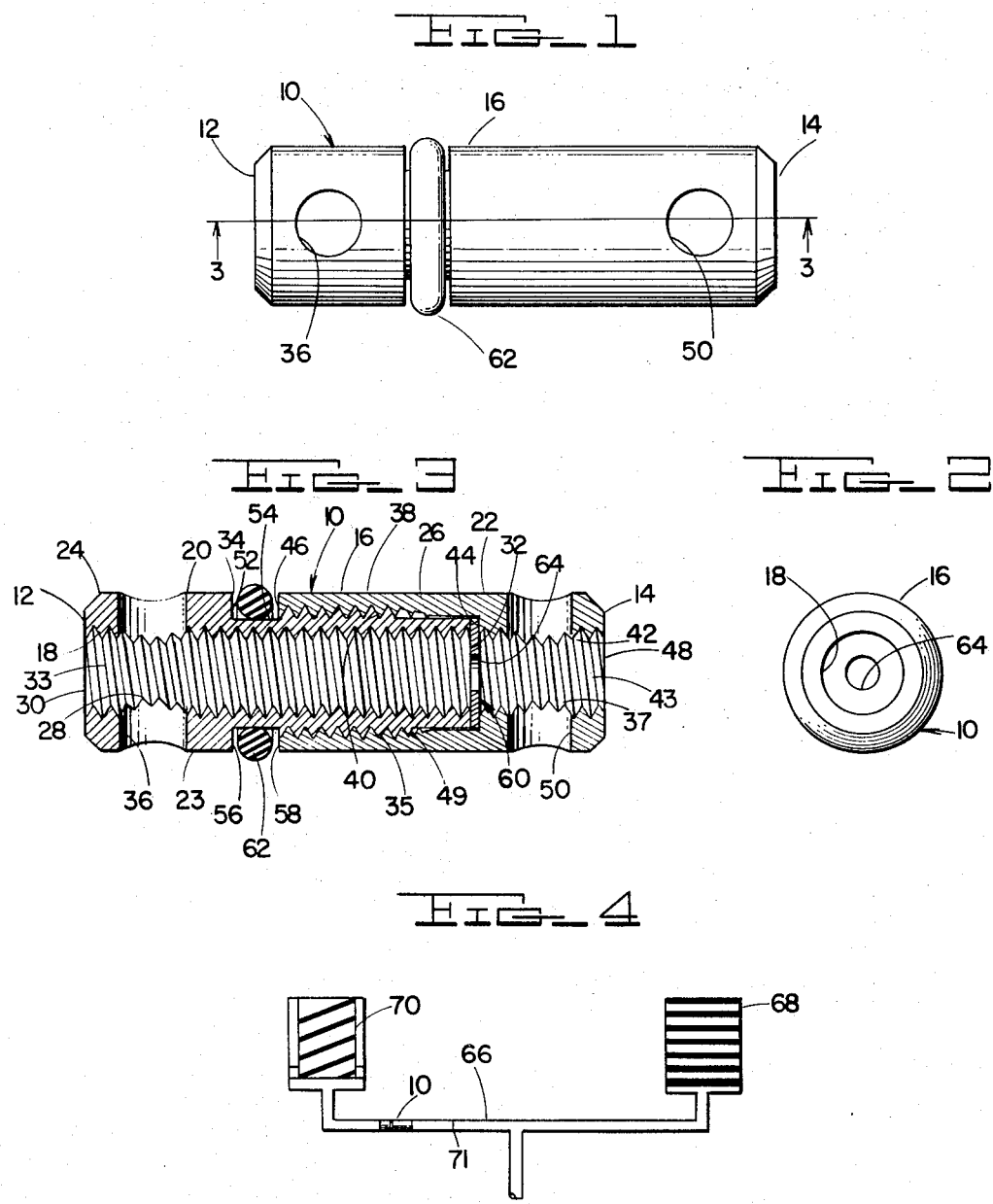
INVENTOR
JESS A. LEWIS
BY Hood, Gust & Irish
ATTORNEYS United States Patent Office 3,354,996
Patented Nov. 28, 1967

3,354,996
APPARATUS AND METHOD FOR
CLUTCH REPAIR
Jess A. Lewis, 1230 Dell Cove Drive,
Fort Wayne, Ind. 46804
Filed July 21, 1965, Ser. No. 473,636
18 Claims. (Cl. 192—85)

ABSTRACT OF THE DISCLOSURE

An apparatus and method for repairing a slipping fluid actuated clutch connected in series and upstream of a hydraulic cushion-device by reducing the slippage thereof. The method includes the steps of breaking the passage connecting the cushion-device and the clutch, positioning a flow-restricting device in the passage to restrict the flow of fluid therebetween a degree corresponding to a maximum fluid flow without clutch slippage and repairing the break in the passage. The flow restricting device includes a tubular member having a cylindrical exterior surface and a cylindrical interior bore. The exterior surface has an annular groove therein and an O-ring in the groove for sealing the member within the passage. The member is provided with disc-shaped plates having orifices therein which can be mounted transversely of said member to selectively restrict the flow through the bore of the member when a greater restriction to the flow through the passage than the bore is desired.

---

The present invention relates generally to an apparatus and method for repairing fluid actuated clutches, and more specifically, to an apparatus and method for reducing the slippage of a fluid actuated clutch which is connected in series and upstream of a hydraulic cushion-device.

One such fluid actuated clutch was provided, subsequent to 1956, in all "Hydramatic" automatic transmissions sold under the trademark "Jetaway" in series connected relationship with an oil accumulator. The dual provision of the clutch and the oil accumulator is provided to engage the plates of the clutch with a sufficient force and in a manner so as to ensure a smooth engagement of the clutch and subsequent clutch operation without slipping occuring between the clutch plates. The oil accumulator, consisting generally of a resiliently mounted piston, functions to control the application of the pressure to the clutch and thereafter maintain the pressure at a sufficient level to prevent the aforementioned slippage. However, the clutch plates provided as original equipment, after use, may either become worn or coated with a lacquer material, which is a product of the decomposition of transmission oil, to such a degree that slippage occurs between the plates of the clutch. When such slippage presents itself, the transmission will, in the extreme case, fail to transmit power from the engine to the drive shaft, or in the mild case, cause the clutch to slip on the application of the oil pressure to the clutch during the initial stages of a shift from a lower gear to a higher gear. Especially prevalent is the slippage between second and third gears of the aforementioned "Jetaway" "Hydramatic" transmission.

While this defect in fluid actuated clutches had been recognized prior to this invention, the conventional remedial repair for such a defect has been the replacement of the clutch plates causing the defect or the entire clutch itself. Such clutches, however, are relatively expensive and the replacement thereof cannot be accomplished without dismantling a substantial portion of the transmission. Therefore, such repair has been expensive both as to labor and replacement parts. Further, while such a defect commonly displays itself in an excessive amount of free-wheeling subsequent to the application of the clutch followed by a jerky application of the clutch, which, in its early stages, can be tolerated, the defect will result in excessive wear of the plate surfaces of the clutch, under severe conditions in the burning of the plate surfaces, and finally in the destruction of the clutch. For these reasons, it is desirable to provide a relatively inexpensive means for repairing such a fluid actuated clutch which is prone to slip in the early stages of this defect.

It is therefore the primary object of this invention to provide an apparatus and method for reducing the slippage of a fluid actuated clutch which can be utilized to repair such a clutch that is prone to slip shortly after such a defect is detected.

Another object of this invention is to provide an apparatus and method of repairing a fluid actuated clutch, the clutch plates of which slip subsequent to their initial application due to an insufficient application of pressure therebetween when the clutch is connected in series with and upstream of a hydraulic cushion-device.

A further object of this invention is to provide an improved apparatus for controlling the flow of fluid in hydraulic systems.

Still further an object of this invention is to provide an improved flow-restricting device and a series of disc-shaped plates having a variety of sized orifices therein which can be interchangeably secured in said device and sealingly inserted into a passage of a hydraulic system for controlling the fluid flow and the pressure build-up of the system.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a side view of the improved apparatus of this invention;

FIG. 2 is an end view of the improved apparatus of this invention illustrating one of the disc-shaped plates having an orifice therein secured in the apparatus;

FIG. 3 is a cross-sectional view of the apparatus shown in FIGS. 1 and 2 taken substantially along the section line 3—3 of FIG. 1; and FIG. 4 is a diagrammatic view of the fluid-actuated clutch and oil accumulator of a "Hydramatic" "Jetaway" automatic transmission illustrating the position in which the apparatus of this invention is inserted into the hydraulic system according to the method of this invention to reduce the slippage of the clutch and repair the defect above-mentioned.

In the broader aspects of this invention there is provided a flow-restricting device and a method of inserting the same into the hydraulic system of an automatic transmission adjacent to the fluid actuated clutch for reducing the slippage between the plates of the clutch and repairing the slipping clutch without necessitating the replacing thereof. The apparatus of this invention broadly comprises a tubular member having an exterior cylindrical surface and an interior cylindrical bore extending between the opposite ends thereof. The exterior surface is provided with an annular groove and an O-ring positioned therein. The tubular member is adapted to be positioned within the passage of the hydraulic system having a diameter such that the O-ring is compressed between the exterior surface of the member and the interior surface of the passage thereby sealing the space therebetween.

The method of this invention broadly comprises the steps of: providing a hydraulic cushion-device interconnected in series with an upstream of a fluid actuated clutch;

providing a flow-restricting device with an exterior surface and an interior bore extending between the opposite ends thereof. The device is also provided with an annular groove in the exterior surface thereof and an O-ring positioned in the groove extending radially outwardly of the member beyond the exterior surface thereof; breaking the passage interconnecting the clutch and the hydraulic cushion-device intermediate the same; positioning the flow-restricting device in the passage with the O-ring compressed between the interior surface of the passage and the member; and repairing the break in the passage.

Referring to the drawings, and more specifically, to FIGS. 1, 2, and 3, the apparatus of this invention is shown to comprise a tubular member 10 having opposite ends 12 and 14, a cylindrical exterior surface 16, and a cylindrical interior bore 18. Referring now specifically to FIG. 3, tubular member 10 is shown to comprise a male portion 20 and a female portion 22 which are removably secured together. Male portion 20 has a step-diametered exterior surface 23 having a larger diametered portion 24 and a smaller diametered portion 26. Coaxial of the portions 24 and 26 is a cylindrical interior bore 28 which extends between the ends 30 and 32 of the male portion 20. Larger and smaller portions 24 and 26 of the male portion 20 are arranged in end to end relation with a step 34 therebetween and extend the entire length of the male portion 20 between the opposite ends 30 and 32. Cylindrical bore 28 is threaded at least for a portion adjacent end 30. In the specific embodiment illustrated, bore 28 is shown to be threaded for the entire length of bore 28. These threads 33 are conventional machine threads of any size or threads per inch for the reason which will be mentioned hereinafter. The smaller portion 26 of the exterior surface of male portion 20 is provided with threads 35 extending between a position spaced apart from the step 34 and the end 32. Adjacent end 30 and extending transversely of the bore 28 is a bore 36 which communicates at its opposite ends with the exterior surface portion 24.

Female portion 22 comprises a cylindrical exterior surface 38 and a step diametered interior bore 37 having a larger diametered portion 40 and a smaller diametered portion 42. Portion 40 has a diameter substantially identical with the smaller diametered portion 26 of the male portion 20 and the smaller diametered portion 42 has a diameter substantially equal to the bore 28 of the male portion 20. Both portions 40 and 42 are coaxial with the cylindrical surface 38 and arranged in end to end relation with a step 44 therebetween. Portions 40 and 42, thus arranged, extend between the opposite ends 46 and 48 of the female portion 22. Both portions 40 and 42 have threads formed thereon. Portion 40 has threads 49 extending the entire length thereof from end 46 of a size and type which mate with the threads 35 of the portion 26 of the male portion 20. Portion 42 has threads 43 for at least a portion adjacent end 48 which are identical to and match the threads 33 of the bore 28 of the male portion 20. Adjacent end 48 and extending transversely of the portion 42 is a bore 50 which communicates at its opposite ends with the surface 38.

Male portion 20 and female portion 22 can be joined in secured relation with portion 26 of the male portion 20 inserted into the portion 40 of the female portion 22 with the threads 35 of the male portion and the threads 49 of the female portion in mating relationship. In this position, the male portion 20 and female portion 22 are removably secured together and surfaces 24 and 38 and bores 28 and 42 are positioned substantially on the same axis thereby defining continuously extending bore 18 and exterior surface 16, which, as aforementioned, extend between the opposite ends 12 and 14 of the tubular member 10. Further, the threaded portions of the bore 18 are positioned adjacent the ends 12 and 14 as are the transverse bores 36 and 50. Further, in the above-mentioned secured position, end 46 of the female portion 22 is spaced apart from step 34 of the male portion 20 thereby cooperating with each other to define an annular groove 52. Annular groove 52 has a bottom 54 which is coaxial to the bore 18 and the surface 16 and two oppositely and upstanding facing side walls 56 and 58 which extend from the bottom 54 generally perpendicularly thereto. Side walls 56 and 58 are, in fact, the surfaces of step 34 and end 46, respectively; bottom 54 is a portion of the surface of surface portion 26 adjacent step 34.

Still further, when male portion 20 and female portion 22 are secured together as above-mentioned, end 32 is positioned adjacent step 44 of the female portion 22 with bore 28 and portion 42 in registry with each other. Whenever orifice plate 60 is not positioned within bore 18 of the tubular member 10, end 32 is contiguous to the step 44 and in mating relationship therewith whereby bore 18 is continuous between opposite ends 12 and 14 of the tubular portion 10.

An O-ring 62 is positioned in groove 52. O-ring 62 has an exterior diameter larger than the tubular member 10 such that the O-ring extends radially outwardly farther than the exterior surface 16 of the tubular member 10. Further, O-ring 62 has a cross-sectional diameter which is less than the distance between side walls 56 and 58 of the groove 52. These relative dimensions allow the O-ring 62 to be compressed between the bottom 54 of the groove 52 and the side walls 56 and 58 and the interior surface of a passageway in which the member 10 will be positioned both for the purpose of sealing the member 10 to the interior wall of the passageway aforementioned and for keeping the member 10 in position in the passageway and restraining movement therebetween.

Referring to FIGS. 2 and 3, there is shown one of the disc-shaped plates 60 which can be positioned within the bore 18 of the member 10 for further restricting the bore 18. As will be obvious from the description of the method of this invention hereinafter, it is contemplated by this invention to provide a series of plates 60 each of which has substantially the same thickness and exterior diametral size, but each of which has a different sized orifice 64 therein. A plate 60 can be secured within bore 18 of the member 10 by positioning the plate 60 within portion 40 of passage 37 and between end 32 of the male portion 20 and step 44 of the female portion 22; and then, by threading the male portion 20 and the female portion 22 together into secured relation thereby clamping a peripheral portion of the plate 60 between end 32 and step 44. While each of the plates 60 has a different sized orifice 64 therein, all of the orifices 64 have diameters which are smaller than the diameter of bore 18.

In the specific embodiment illustrated and sized to fit a five-sixteenths inch I.D. passageway, the tubular member 10 has an exterior diameter in the order of nineteen sixty-fourths inch and an axial length of approximately one inch; bore 18 has a diameter of approximately five thirty-seconds inch; and plates 60 are furnished with orifices 64 having diameters of about nine sixty-fourths inch, seven sixty-fourths inch, and one-sixteenth inch, respectively.

In operation, the tubular member 10 can be inserted into a passage and positioned where desired relatively easily. Correct insertion of the tubular member 10 within the scope of this invention includes the selection of the member 10 with a diameter slightly smaller than the interior diameter of the passage and a corresponding depth of the groove 52 and diameter of the O-ring 62 such that the uncompressed O-ring has a diameter slightly larger than the interior diameter of the passage thereby requiring that when the member 10 is positioned within the aforementioned passage, the O-ring will be compressed between the member 10 and the interior surface of the passage within the groove 52. The member 10 being positioned in a passage in such a manner is not only in sealing relation with the interior surface of the passage by means of the compressed O-ring therebetween, but further, is restrained from movement relative to the passage by means of the frictional resistance between the O-ring, which is positioned in groove 52, and the interior wall of the passage. In such a position, obviously, the passage is partially restricted by the member 10. Any fluid, i.e., transmission oil, within the passage must enter the bore 18 and flow through the member 10.

Positioning the member 10 within a passage is made easy by the provision of threads 33 and 43, respectively, adjacent ends 12 and 14 of member 10 in bore 18. These threads are adapted to receive a conventional machine bolt having threads which will mate with threads 33, 43, such that the bolt can be threadedly secured to the member 10 and the member 10 inserted into a passage by means of inserting the stud portion of the bolt into the passage thereby to position the member 10 where desired. The bolt then may be moved from the member 10 and the passage leaving the member 10 within the passage. Whenever the member 10 is desirably removed, the bolt can be again threaded into the bore 18 until it is secured to the member 10 and the member 10 and the bolt removed from the passage.

Member 10 is also adapted by means of the male portion 20 and the female portion 22 which are secured together by the threads 49 of the bore 40 and the threads 35 of the portion 26, respectively, to be separated into two pieces for the insertion of a plate 60 having an orifice therein as aforementioned. When a plate 60 is positioned within member 10 and member 10 is positioned within a passage, the member 10 functions to restrict the passage in varying degrees, depending on the size of the orifice 64. If, in other words, the restriction afforded by the bore 18 of the member 10 is insufficient, male portion 20 and female portion 22 may be separated and a plate 60 with an orifice 64 therein which is smaller than the bore 18 in diameter may be inserted within the portion 40 of the female member 22 adjacent the step 44 and secured in that position between the step 44 and the end 32 of the male portion 20 by reassembling and securing the male portion 20 and the female portion 22 together. While the insertion of the plates 60 in the member 10 varies the distance between the side walls 56 and 58 of the groove 52, this variation is slight as the variance corresponds only to the thickness of the plates 60 and such a variation is not critical to the sealing of the member 10 to the passage in which it is positioned by means of the O-ring 62.

The disassembly of the male portion 20 and the female portion 22 and the reassembly thereof is aided by the provision of bores 36 and 50 adjacent the opposite ends 12 and 14 of the member 10, respectively. Obviously, whenever the member 10 is assembled, sufficient force must be exerted between the male portion 20 and female portion 22 to secure the two pieces together. While this may be done by engaging a pair of pliers to each of the male and female members 20 and 22, respectively, or in the alternative, using a pair of grippers, wrenches, or the like, the provision of the bores 36 and 50 allows stiff wires or rods to be inserted through each of the male member 20 and female member 22, respectively, for the application of such a force therebetween. Thus, while the provision of the bores 36 and 50 aid in the manipulation of member 10 and is provided in the specific embodiment illustrated in the figures, the provision of oppositely facing and parallel flat portions in the surface 16 of member 10 adjacent opposite ends 12 and 14 allowing the wrench to be used in their stead, is also within the scope of this invention.

Now referring to FIG. 4 and the performance of the method of this invention, the member 10 is inserted into an oil passage 66 of the above-mentioned type of automatic transmission which has a fluid actuated clutch 68 connected by the passage 66 in series and upstream of a hydraulic cushion-device 70. This positioning of the member 10 in the passage 66, either without a plate 60 or with plate 60 having the appropriately sized orifice 64 therein, functions to restrict the flow of oil to the hydraulic cushion-device 70 and to increase the oil pressure acting on the clutch 68 and thereby increases the pressure at which the clutch plates (not shown) are initially applied. In such a passage and in the above-mentioned sealing relation therewith, the member 10 thereby repairs the clutch 68, which, prior to the insertion of the member 10, would slip upon the engagement of the clutch plates to the extent that the clutch 68 did not perform as desired.

More specifically, the method of this invention of reducing the slippage of a fluid actuated clutch 68 within the scope of this invention comprises the steps of: first, providing a hydraulic cushion-device 70 connected in series with a fluid actuated clutch 68 by means of a common passage 66 with the cushion-device 70 being downstream of the clutch 68; second, providing a flow-restricting device comprising the tubular member 10 above-described; third, breaking the passage 66 intermediate the cushion-device 70 and the clutch 68 or at 71; fourth, positioning the member 10 without a plate 60 secured therein in the passage 66 as aforementioned with the O-ring 62 compressed between the interior surface of the passage 66 and the member 10, within the groove 52; fifth, repairing the break in the passage 66; sixth, determining whether the clutch 68 still slips when the transmission shifts from second to third gears, and if the slippage in the clutch 68 remains; seventh, breaking the passage 66 intermediate the cushion-device 70 and the clutch 68 in accordance with the third step of the method of this invention; eighth, removing the tubular member 10 from the passage 66 either as above-described or by a suitable alternative method; ninth, separating the male portion 20 and the female portion 22 of the tubular member 10 into two pieces as above-described; tenth, providing a disc-shaped plate 60 having an orifice 64 therein which is smaller in diameter than the bore 18 of the tubular member 10; eleventh, positioning the plate 60 within the portion 40 of the female portion 22 transversely of the bore 18 and adjacent to the step 44 thereof; twelfth, connecting the male portion 20 and the female portion 22 together and threading them into secured relation whereby the plate 60 is held in secured relation with the member 10 with a peripheral portion of plate 60 being between the end 32 of the male portion 20 and step 44 of the female portion 22; thirteenth, positioning the member 10 with the plate 60 secured therein into the passage 66 aforementioned in accordance with the fourth step of the method of this invention; fourteenth, repairing the break in the passage 66; fifteenth, determining whether the clutch 68 still slips when the transmission shifts from second to third gear and if slippage in the clutch 68 remain; sixteenth, breaking the passage 66 intermediate the cushion-device 70 and the clutch 68 in accordance with the third step of the method of this invention; seventeenth, removing the member 10 from the passage 66 as accomplished in the eighth step of this invention; eighteenth, providing another disc-shaped plate 60 having a smaller orifice 64 therein than the plate 60 previously secured within member 10; nineteenth, separating the male portion 20 and the female portion 22 of the member 10 and removing the plate 60 previously positioned within the female portion 22; twentieth, positioning the disc-shaped plate 60 having the smaller orifice 64 therein within the portion 40 of the female portion 22 adjacent step 44 and transversely of the interior bore 18 of the member 10; twenty-first, connecting the male and female portions together and threading the same into secured relation thereby also securing the plate 60 between the end 32 of the male portion 20 and step 44 of the female portion 22; twenty-second, positioning the member 10 in the passage 66 with the O-ring compressed between the interior surface of the passage and the member 10 as aforedescribed with reference to the fourth and thirteenth steps of the method of this invention; twenty-third, repairing the break in the passage 66; twenty-fourth, determining whether the clutch 68 still slips when the transmission shifts from second to third gear and if slippage remain in the clutch 68; twenty-fifth, repeating the last-mentioned nine steps until the flow-restricting device having the plate 60 secured therein with the largest diametered orifice 64 which corresponds to the clutch 68 not slipping and the clutch 68 shifting from second to third gear smoothly is positioned in the passage 66.

As above-mentioned, in the specific embodiment illustrated, plates 60 are provided with orifices 64 having diameters measuring about nine sixty-fourths inch, seven sixty-fourths inch, and one-sixteenth inch in diameter, respectively; experience indicates that these orifices 64 will cure slippage in the clutch if it is mild, fairly severe and extreme, respectively. If an undersized orifice 64, or, in other words, orifice 64 that is smaller than that required to eliminate the slipping in the clutch 68, is placed within the passage as above-described, the clutch plates of the clutch 68 will be engaged too rapidly and under excessive pressure causing the transmission to shift with a jerk. Therefore, it is a necessary element of this invention to first position the member 10 within the passage 66 without a plate 60 to see if the restriction of the member 10 alone is sufficient to correct the defect, and then, sucessively to add the plates 60 in order of decreasing diameters of the orifices 64 therein to determine the largest orifice 64 which will remedy the defect of the clutch 68.

In the method of this invention above-described, the steps calling for the determination of whether the clutch 68 slips conventionally consist of placing the transmission in operation and driving the car at a variety of speeds to determine whether the shift from second to third gear occurs without the slipping or jerking above-mentioned. No method of making this determination with the transmission disassembled is now known to the art. However, the determination can be made and the steps of breaking the passage 66, removing the flow-restricting device, and repositioning the flow-restricting device can be performed with the transmission mounted in operating position in the vehicle. Further, the last-mentioned steps can be performed with mininum dismantling of the transmission since a suitable oil passage is readily accessible to the repairman after the oil pan of the transmission is removed.

While there have been described above the principles of this invention in connection with specific apparatus, it is to be clearly understood that this description is made only by way of example and not as a limitation to the scope of this invention.

What is claimed is:

1. A flow-restricting device comprising a tubular member having opposite ends, a cylindrical exterior surface and a cylindrical interior bore, said exterior surface and said interior bore being coaxial and extending between the opposite ends of said member, said exterior surface having an annular groove therein intermediate said ends, said annular groove having a bottom surface coaxial with said interior bore and said exterior surface and two opposite facing and upstanding side walls generally perpendicular thereto, and an O-ring positioned in said groove, said O-ring having a portion thereof radially extending beyond said exterior surface, said side walls being spaced apart a distance greater than the cross-sectional diameter of said O-ring.

2. The flow-restricting device of claim 1 further comprising a plate secured to said member in said bore, said plate being transverse to said member and having an orifice therein, said orifice being within and smaller than said bore, whereby flow through said bore is partially restricted by said plate.

3. The flow-restricting device of claim 1 wherein said bore is threaded adjacent each end of said member.

4. A flow-restricting device comprising a tubular member having a male portion and a female portion which are removably secured together, said male portion having a step-diametered exterior surface and a cylindrical interior bore, said step-diametered exterior surface having a larger diametered portion and a smaller diametered portion both of which are coaxial of said cylindrical bore, said larger and smaller portion being arranged in end to end relation and with a step therebetween, said larger and smaller portions and said cylindrical bore extending between the opposite ends of said male portion, said cylindrical bore being threaded for at least a portion thereof adjacent the distal end of said larger portion, said smaller portion of said exterior surface being threaded between its distal end and a position adjacent and spaced apart from said step, said female portion having a cylindrical exterior surface and a step-diametered interior bore, said step-diametered bore having a first portion with a diameter substantially identical with said smaller portion and a second portion with a diameter substantially identical with said cylindrical bore, said first and second portions being arranged in end to end relation with a step therebetween, said first and second portions and said cylindrical surface extending between the opposite ends of said female portion, said first and second portions being coaxial of said cylindrical surface, said first and second portions being threaded adjacent to the distal end thereof, said smaller portion and said first portion overlapping each other with the threads thereof in mating relationship and both of said bores and both of said exterior surfaces being on substantially a continuation of the same axis, said threads of said second portion being identical to the threads of said larger portion, said first portion having an annular end surface at its distal end which cooperates with said step of said male portion and said smaller surface portion adjacent to said step to define an annular groove with a bottom surface coaxial with said interior bores and exterior surfaces and two opposite facing and upstanding side walls generally perpendicular thereto, said smaller portion of said male portion having an annular end surface at its distal end which mates with the step of said female portion, whereby said bores are placed in end to end relationship and substantially form a single continuous bore which is threaded adjacent the opposite ends thereof, and an O-ring positioned in said groove, said O-ring having a portion thereof radially extending beyond said exterior surface, said O-ring having a cross-sectional diameter less than the distance between said side walls.

5. The flow-restricting device of claim 4 further comprising a disc-shaped plate having an orifice therein, said plate being removably secured transversely of said member in said bore with a peripheral portion thereof positioned between said female portion step and said male portion annular end surface, said orifice being within and smaller than said bore whereby flow through said bore is partially restricted by said plate.

6. In an automatic transmission of the class wherein a hydraulic cushion-device and a fluid actuated clutch are interconnected by a common oil passage in series; the combination with said cushion-device, clutch and passage of a flow-restricting device positioned in said passage between said clutch and cushion-device and downstream of said clutch, said flow-restricting device having a tubular member with opposite ends, a cylindrical exterior surface and a cylindrical interior bore, said exterior surface and said interior bore being coaxial and extending between the opposite ends of said member, said exterior surface having an annular groove therein intermediate said ends, said annular groove having a bottom surface coaxial with said interior bore and said exterior surface and two opposite facing and upstanding side walls generally perpendicular thereto, and an O-ring positioned in said groove, said O-ring having a portion thereof radially extending beyond said exterior surface, said side walls being spaced apart a distance greater than the cross-sectional diameter of said O-ring, said O-ring being compressed between the interior surface of said passage and said member, whereby said member and passage are in sealing relation and said member is restrained from moving within said passage.

7. In an automatic transmission of the class wherein a hydraulic cushion-device and a fluid actuated clutch are interconnected by a common oil passage in series; the combination with said cushion-device, clutch and passage of a flow-restricting device positioned in said passage between said clutch and cushion-device and downstream of said clutch, said flow-restricting device having a tubular member with a male portion and a female portion which are removably secured together, said male portion having a step-diametered exterior surface and a cylindrical interior bore, said step-diametered exterior surface having a larger diametered portion and a smaller diametered portion both of which are coaxial of said cylindrical bore, said larger and smaller portion being arranged in end to end relation and with a step therebetween, said larger and smaller portions and said cylindrical bore extending between the opposite ends of said male portion, said cylindrical bore being threaded for at least a portion thereof adjacent the distal end of said larger portion, said smaller portion of said exterior surface being threaded between its distal end and a position adjacent and spaced apart from said step, said female portion having a cylindrical exterior surface and a step diametered interior bore, said step-diametered bore having a first portion with a diameter substantially identical with said smaller portion and a second portion with a diameter substantially identical with said cylindrical bore, said first and second portions being arranged in end to end relation with a step therebetween, said first and second portions and said cylindrical surface extending between the opposite ends of said female portion, said first and second portions being coaxial of said cylindrical surface, said first and second portions being threaded adjacent to the distal ends thereof, said smaller portion and said first portion overlapping each other with the threads thereof in mating relationship and both of said bores and both of said exterior surfaces being on substantially a continuation of the same axis, said threads of said second portion being identical to the threads of said larger portion, said first portion having an annular end surface at its distal end which cooperates with said male step of said male portion and said smaller surface portion adjacent to said step to define an annular groove with a bottom surface coaxial with said interior bores and exterior surfaces and two oppositely facing and upstanding side walls generally perpendicular thereto, said smaller portion of said male portion having an annular end surface at its distal end which mates with the step of said female portion, whereby said bores are placed in end to end relationship and substantially form a single continuous bore which is threaded adjacent the opposite ends thereof, and an O-ring positioned in said groove, said O-ring having a portion thereof radially extending beyond said exterior surface, said O-ring having a cross-sectional diameter less than the distance between said side walls, said O-ring being compressed between said passage and said member, whereby said member and passage are in sealing relation, and said member is restrained from moving within said passage.

8. The combination of claim 7 further comprising a plate having an orifice therein, said plate being removably secured transversely of said member in said bore with a peripheral portion thereof positoned between said female portion step and said male portion annular end surface, said orifice being within and smaller than said bore whereby flow through said bore is partially restricted by said plate.

9. The method of reducing the slippage of a fluid actuated clutch which is interconnected in series with a hydraulic cushion-device by a common passage, said cushion-device being downstream of the clutch, said method comprising the steps of providing a flow-restricting device having a tubular member with opposite ends, a cylindrical exterior surface and a cylindrical interior bore, said exterior surface and said interior bore being coaxial and extending between the opposite ends of said member, said exterior surface having an annular groove therein intermediate said ends, said annular groove having a bottom surface coaxial with said interior bore and said exterior surface and two opposite facing and upstanding side walls generally perpendicular thereto, and an O-ring positioned in said groove, said O-ring having a portion thereof radially extending beyond said exterior surface, said side walls being spaced apart a distance greater than the cross-sectional diameter of said O-ring, breaking said passage intermediate said cushion-device and clutch, positioning said flow-restricting device in said passage with said O-ring compressed between the interior surface of said passage and said member, and repairing the break in said passage.

10. The method of repairing a slipping fluid actuated clutch which is interconnected in series with a hydraulic cushion-device by a common passage, said cushion-device being downstream of the clutch, said method comprising the steps of providing a flow-restricting device having a tubular member with a male portion and a female portion which are removably secured together, said male portion having a step-diametered exterior surface and a cylindrical interior bore, said step-diametered exterior surface having a larger diametered portion and a smaller diametered portion both of which are coaxial of said cylindrical bore, said larger and smaller portion being arranged in end to end relation and with a step therebetween, said larger and smaller portions and said cylindrical bore extending between the opposite ends of said male portion, said cylindrical bore being threaded for at least a portion thereof adjacent the distal end of said larger portion, said smaller portion of said exterior surface being threaded between its distal end and a position adjacent and spaced apart from said step, said female portion having a cylindrical exterior surface and a step-diametered interior bore, said step-diametered bore having a first portion with a diameter substantially identical with said smaller portion and a second portion with a diameter substantially identical with said cylindrical bore, said first and second portions being arranged in end to end relation with a step therebetween, said first and second portions and said cylindrical surface extending between the opposite ends of said female portion, said first and second portions being coaxial of said cylindrical surface, said first and second portions being threaded adjacent to the distal ends thereof, said male and female portions being in secured relation with said smaller portion and said first portion overlapping each other and with the threads thereof in mating relationship and said bores and exterior surfaces being on substantially a continuation of the same axis, said threads of said second portion being identical to the threads of said larger portion, said first portion having an annular end surface at its distal end which cooperates with said step of said male portion and said smaller surface portion adjacent to said step to define an annular groove with a bottom surface coaxial with said interior bores and exterior surfaces and two opposite facing and upstanding side walls generally perpendicular thereto, said smaller portion of said male portion having an annular end surface at its distal end which mates with the step of said female portion, whereby said bores are placed in end to end relationship and substantially form a single continuous bore which is threaded adjacent the opposite ends thereof, and an O-ring positioned in said groove, said O-ring having a portion thereof radially extending beyond said exterior surface, said O-ring having a cross-sectional diameter less than the distance between said side walls, breaking said passage intermediate said cushion-device and clutch, positioning said flow-restricting device in said passage with said O-ring compressed between the interior surface of said passage and said member, repairing the breaking in said passage, determining whether the clutch still slips, if slippage in the clutch remains, breaking said passage intermediate said cushion-device and the clutch, removing said flow-restricting device, separating said male and female portions of said flow-restricting device, providing a disc-shaped plate having an orifice therein, said orifice having a diameter smaller than said continuous bore of said tubular member, positioning said plate transversely of said interior bore of said female portion within said first portion thereof and adjacent to said step thereof, connecting said male and female portions together thereby holding a peripheral portion of said plate in said member between said female portion step and said male portion annular end, positioning said flow-restricting device in said passage with said O-ring compressed between the interior surface of said passage and said member, repairing the break in said passage, determining whether the clutch still slips, and if slippage in the clutch remains, repeating the above-mentioned sixth, seventh and eighth steps, providing another disc-shaped plate having an orifice therein with a diameter smaller than said last-mentioned orifice, removing said plate previously positioned in said female portion of said member from said flow-restricting device, positioning said last-mentioned plate having said smaller orifice therein transversely of said interior bore of said female portion within said first portion and adjacent said step thereof, connecting said male and female portions together thereby holding a peripheral portion of said plate in said member between said female portion step and said male portion annular end, and repeating the last-mentioned eight steps until said flow-restricting device having the plate with the largest diametered orifice therein corresponding to no slippage in the clutch is positioned in said passage.

11. The method of claim 10 wherein said removing and positioning steps comprise the steps of: inserting the threaded stud portion of a bolt having threads thereon into said passage, positioning said stud portion in said continuous bore of said flow-restricting device with said threads of said bolt and continuous bore in mating relationship whereby said bolt and tubular member are removably secured together, and moving said bolt and flow-restricting device as a unit as desired.

12. The method of reducing the slippage of a fluid actuated clutch which is interconnected in series with a hydraulic cushion-device by a common passage, said cushion-device being downstream of the clutch, said method comprising the steps of providing a flow-restricting device, breaking said passage intermediate said cushion-device and clutch, positioning said flow-restricting device in said passage, and repairing the break in said passage with said flow-restricting device remaining in said passage.

13. A flow-restricting device comprising a member having opposite ends, an exterior surface and an interior bore, said exterior surface and said interior bore extending between the opposite ends of said member, said exterior surface having an annular groove therein intermediate said ends, said annular groove having a bottom surface and two opposite facing and upstanding side walls, and an O-ring positioned in said groove, said O-ring having a portion thereof radially extending beyond said exterior surface, said side walls being spaced apart a distance greater than the cross-sectional diameter of said O-ring.

14. The flow restricting device of claim 13 further comprising a plate secured to said member in said bore, said plate being transverse to said member and having an orifice therein, said orifice being within and smaller than said bore, whereby flow through said bore is partially restricted by said plate.

15. A flow-restricting device comprising a member having a male portion and a female portion which are removably secured together, said male portion having a step-diametered exterior surface and an interior bore, said step-diametered exterior surface having a larger diametered portion and a smaller diametered portion, said larger and smaller portion being arranged in end to end relation and with a step therebetween, said larger and smaller portions and said bore extending between the opposite ends of said male portion, said bore being threaded for at least a portion thereof adjacent the distal end of said larger portion, said smaller portion of said exterior surface being threaded between its distal end and a position adjacent and spaced apart from said step, said female portion having an exterior surface and a step-diametered interior bore, said step-diametered bore having a first portion with a diameter substantially identical with said smaller portion and a second portion with a diameter substantially identical with said bore, said first and second portions being arranged in end to end relation with a step therebetween, said first and second portions and said surface extending between the opposite ends of said female portion, said first and second portions being threaded adjacent to the distal end thereof, said smaller portion and said first portion overlapping each other with the threads thereof in mating relationship and both of said bores and both of said exterior surfaces being on substantially a continuation of the same axis, said threads of said second portion being identical to the threads of said larger portion, said first portion having an annular end surface at its distal end which cooperates with said step of said male portion and said smaller surface portion adjacent to said step to define an annular groove with a bottom surface and two opposite facing and upstanding side walls, said smaller portion of said male portion having an annular end surface at its distal end which mates with the step of said female portion, whereby said bores are placed in end to end relationship and substantially form a single continuous bore which is threaded adjacent the opposite ends thereof, and an O-ring positioned in said groove, said O-ring having a portion thereof radially extending beyond said exterior surface, said O-ring having a cross-sectional diameter less than the distance between said side walls.

16. In an automatic transmission of the class wherein a hydraulic cushion-device and a fluid actuated clutch are interconnected by a common oil passage in series; the combination with said cushion-device, clutch and passage of a flow-restricting device positioned in said passage between said clutch and cushion-device and downstream of said clutch, said flow-restricting device having a member with opposite ends, an exterior surface and an interior bore, said exterior surface and said interior bore extending between the opposite ends of said member, said exterior surface having an annular groove therein intermediate said ends, said annular groove having a bottom surface and two opposite facing and upstanding side walls and an O-ring positioned in said groove, said O-ring having a portion thereof radially extending beyond said exterior surface, said side walls being spaced apart a distance greater than the cross-sectional diameter of said O-ring, said O-ring being compressed between the interior surface of said passage and said member, whereby said member and passage are in sealing relation and said member is restrained from moving within said passage.

17. The method of reducing the slippage of a fluid actuated clutch which is interconnected in series with a hydraulic cushion-device by a common passage, said cushion-device being downstream of the clutch, said method comprising the steps of providing a flow restricting device having a member with opposite ends, an exterior surface and an interior bore, said exterior surface and said interior bore extending between the opposite ends of said member, first means on said member for sealing said member to the walls of a passage when said member is positioned therein, breaking said passage intermediate said cushion-device and clutch, positioning said flow-restricting device in said passage with said first means effecting a seal between the interior surface of said passage and said member, and repairing the break in said passage, 18. The method of repairing a slipping fluid actuated clutch which is interconnected in series with a hydraulic cushion-device by a common passage, said cushion-device being downstream of the clutch, said method comprising the steps of providing a flow-restricting device having a member with opposite ends, an exterior surface and an interior bore, said exterior surface and said interior bore extending between the opposite ends of said member, first means on said member for sealing said member to the walls of a passage when said member is positioned therein, breaking said passage intermediate said cushion-device and clutch, positioning said flow-restricting device in said passage with said first means effecting a seal between the interior surface of said passage and said member, and repairing the break in said passage, determining whether the clutch still slips, if slippage in the clutch remains, breaking said passage intermediate said cushion-device and the clutch, removing said flow-restricting device from said passage, providing a second flow-restricting device, said second flow-restricting device having a second member with opposite ends, a second exterior surface and a second interior bore, said second exterior surface and said second interior bore extending between the opposite ends of said member, second means on said second member for sealing said second member to the walls of a passage when said second member is positioned therein, and third means including said second bore of said second flow-restricting device for restricting the flow through said passage more than said first-mentioned flow-restricting device, positioning said second flow-restricting device in said passage with said second means effecting a seal between the interior surface of said passage and said second member, repairing the break in said passage, determining whether the clutch still slips, and if slippage in the clutch remains repeating the above-mentioned sixth and seventh steps, providing another flow-restricting device having another member with opposite ends, an exterior surface and an interior bore, said exterior surface and said interior bore of said last-mentioned member extending between the opposite ends of said last-mentioned member, means on said last-mentioned member for sealing said last-mentioned member to the walls of a passage when said last-mentioned member is positioned therein, and means including said interior bore of said last-mentioned flow-restricting device for restricting the flow through said passage more than said second flow-restricting device, positioning said last-mentioned flow-restricting device in said passage, repairing the break in said passage, and repeating the last-mentioned five steps untl said flow-restricting device offering the least resistance to flow in said passage corresponding to no slippage in the clutch is positioned in said passage.

References Cited

UNITED STATES PATENTS

| | | | |
|---|---|---|---|
| 1,137,551 | 4/1915 | Straub et al. | 138—44 |
| 2,460,647 | 2/1949 | Miller | 138—45 |
| 2,816,572 | 12/1957 | Pratt | 138—45 |
| 3,215,236 | 11/1965 | Pensa | 192—109 |
| 3,229,723 | 1/1966 | Janton | 138—44 |

OTHER REFERENCES

Stoeckicht, German printed application, Ser. No. St. 3,097, printed Feb. 16, 1956.

BENJAMIN W. WYCHE III, *Primary Examiner.*